Patented Nov. 10, 1931

1,831,759

UNITED STATES PATENT OFFICE

HEIN ISRAEL WATERMAN, OF DELFT, NETHERLANDS, ASSIGNOR TO DE BATAAFSCHE PETROLEUM MAATSCHAPPIJ, OF THE HAGUE, NETHERLANDS

PROCESS FOR TREATING CARBONACEOUS MATERIALS

No Drawing. Application filed June 6, 1929, Serial No. 369,004, and in the Netherlands July 3, 1928.

The present invention involves a process for the manufacture of liquid products from coal or other carbonaceous materials and for the liquefaction of these raw materials.

The object of the invention is to obtain or render possible a maximum conversion of the said materials into liquid products by the known method according to which the primary substances are exposed to the action of hydrogen or gases or vapours containing hydrogen under a high temperature and pressure and in the presence of a contact mass or catalyst.

In particular the invention concerns a catalyst eminently suitable for the above-mentioned process.

In the French Patent No. 618,490, attention is drawn to the favourable catalytic effect exercised upon the hydrogenation process by an alkaline, iron oxide-containing mass known commercially under name of "Luxmass", which is obtained as a by-product from the wet-treatment of bauxite to aluminium-oxide. This mass is an alkaline iron oxide-containing mass which is obtained as a by-product from the conversion of bauxite to aluminum oxide by the wet treatment and is employed for purifying illuminating gas. (See, for instance, Ullmann "Enzyklopädie der technischen Chemie", 1st edition, vol. 1, p. 314.)

It has now been discovered that this Luxmass can be brought into a state in which, in comparison with the original mass, it has a more favourable effect upon the process of hydrogenation, that is to say the percentage of coal remaining after hydrogenation is considerably smaller than in the case with the original Luxmass.

I have found that when commercial Luxmass is treated as will be described more fully hereinafter, its catalytic effect on the process mentioned above is considerably increased.

The treatment according to my invention consists in washing Luxmass either once or several times with water either at ordinary or at higher temperature, whereby certain substances are removed and a mass is obtained which acts better catalytically than the original mass.

As examples of the treatment of the Luxmass the following may serve:

I. 40 grammes of the mass containing 36.6 grammes dry substance, was treated and retreated on the steam bath with about 0.5 litre water at a time, after settling the liquid was poured off.

The mass was then filtered and dried at about 120° C. It was found that in this manner 13.4% of the original dry substance treated had been removed.

205 grammes Carisborg brown coal, with a content of 181.5 grammes dry and ashfree coal, were brought into an autoclave together with 15.4 grammes of the mass prepared as described above containing 1.5 grammes of water and 13.9 grammes dry substance. The mass was heated in the presence of hydrogen under an initial pressure of 100 kg./cm.$^2$ to a temperature of about 450–460° C.

Calculated on dry and ashfree brown coal, the reaction products comprised 6.7% hydrocarbons boiling up to 220° C., 8.6% hydrocarbons boiling between 220–300° C., 4.9% phenolic substances boiling up to 300° C., 39.3% of a heavy asphaltic residue and 3.4% of coke.

An analogous experiment was carried out with an equivalent quantity of the original Luxmass, whereby the following yields were obtained: 4.9% hydrocarbons boiling up to 220° C., 5.5% hydrocarbons boiling between 220–300° C., 3.8% phenolic substances boiling up to 300° C., 39.6% of a heavy asphaltic residue and 13.0% of coke.

From a comparison of the two experiments it will be seen that the contact mass according to my invention gives higher yields of lower boiling hydrocarbons and that the percentage of coke is much smaller.

II. Luxmass is washed with water several times and thereafter the finer-grained particles are separated from the coarser grained ones. The finer-grained part appeared to have a more favourable influence on the hydrogenation process than the original Luxmass.

Carisborg brown coal was treated in the same way as described in relation to Example I, but in the presence of the same amount of the finer-grained particles obtained as described above. The yields calculated on ash- and moisture-free brown coal were as follows: 6.4% hydrocarbons boiling up to 220° C., 6.1% hydrocarbons boiling between 220 and 300° C., 4.1% phenolic substances boiling up to 300° C., 45.2% heavy asphaltic residue, 3.6% of coke.

The use of the catalyst according to this invention is in no way restricted to any special manner of carrying out destructive hydrogenation but can be applied advantageously in all processes whereby carbonaceous materials are exposed to heat and pressure in the presence of hydrogen or hydrogen-containing gases for the purpose of obtaining valuable products therefrom.

What I claim is:

A process for treating carbonaceous materials in the presence of hydrogen under elevated temperature and pressure for obtaining valuable products therefrom, comprising the step of subjecting the initial materials to destructive hydrogenation in the presence of a mass derived from an alkaline iron oxide-containing mass obtained from the conversion of bauxite to aluminum oxide by the wet treatment by removing water-soluble substances therefrom.

In testimony whereof I have affixed my signature.

HEIN ISRAEL WATERMAN.